United States Patent
Bangma et al.

(10) Patent No.: US 11,153,580 B2
(45) Date of Patent: Oct. 19, 2021

(54) PARTIAL VIDEO DECODING METHOD, DEVICE AND SYSTEM

(71) Applicant: Koninklijke KPN N.V., Rotterdam (NL)

(72) Inventors: Menno Bangma, The Hague (NL); Ray Van Brandenburg, Rotterdam (NL); Arjen Veenhuizen, Utrecht (NL)

(73) Assignee: KONINKLIJKE KPN N.V., Rotterdam (NL)

( * ) Notice: Subject to any disclaimer, the term of this patent is extended or adjusted under 35 U.S.C. 154(b) by 0 days.

(21) Appl. No.: 16/329,604

(22) PCT Filed: Sep. 8, 2017

(86) PCT No.: PCT/EP2017/072665
§ 371 (c)(1),
(2) Date: Feb. 28, 2019

(87) PCT Pub. No.: WO2018/046705
PCT Pub. Date: Mar. 15, 2018

(65) Prior Publication Data
US 2019/0200029 A1    Jun. 27, 2019

(30) Foreign Application Priority Data

Sep. 8, 2016 (EP) .................................... 16187861

(51) Int. Cl.
*H04N 19/169*    (2014.01)
*H04N 19/174*    (2014.01)
(Continued)

(52) U.S. Cl.
CPC ......... *H04N 19/188* (2014.11); *H04N 19/119* (2014.11); *H04N 19/167* (2014.11);
(Continued)

(58) Field of Classification Search
CPC .... H04N 19/44; H04N 19/107; H04N 19/159; H04N 19/503; H04N 19/593; H04N 19/50
See application file for complete search history.

(56) References Cited

U.S. PATENT DOCUMENTS 6,567,086 B1    5/2003    Hashimoto
8,208,790 B2    6/2012    Toma et al.
(Continued)

FOREIGN PATENT DOCUMENTS

WO    2010069427 A1    6/2010
WO    WO 2015/011108    1/2015
(Continued)

OTHER PUBLICATIONS

Y.H. Chen & V. Sze, "A Deeply Pipelined CABAC Decoder for HEVC Supporting Level 6.2 High-Tier Applications", 25 IEEE Transactions on Circuits & Systems for Video Tech. 856-868 (May 2015) (Year: 2015).*

(Continued)

*Primary Examiner* — David N Werner
(74) *Attorney, Agent, or Firm* — Hamilton, Brook, Smith & Reynolds, P.C.

(57) ABSTRACT

Encoded video data representing partial video images is decoded from a first video stream such as a HEVC bitstream. The first video stream comprises video images divided into a spatial array of independently decodable slices. The first video stream comprises network abstraction layer units that each contain video content data for a respective one of the slices preceded by a header that comprises parameters relating to the respective one of the slices in relation to the first video stream. Previously prepared information such as meta data about positions of parameters in the network abstraction layer units or a plurality of different versions of the network abstraction layer units for different partial image (Continued)

sizes (different picture sizes) is used. The meta data may be used for partially rewriting the network abstraction layer units for a subarray of slices, the network abstraction layer units being rewritten at a location selected on the basis of meta data, to make the network abstraction layer units consistent with a second video stream of encoded video data only for the sub-array of slices. Versions of the network abstraction layer units may be selected for the sub-array of slices, from the plurality of different versions. Subsequently, the partial video images are generated by decoding the encoded video data from the rewritten network abstraction layer units.

11 Claims, 6 Drawing Sheets

(51) Int. Cl.
| | |
|---|---|
| H04N 19/88 | (2014.01) |
| H04N 19/167 | (2014.01) |
| H04N 21/2343 | (2011.01) |
| H04N 21/4728 | (2011.01) |
| H04N 19/40 | (2014.01) |
| H04N 19/119 | (2014.01) |
| H04N 19/46 | (2014.01) |

(52) U.S. Cl.
CPC ........... *H04N 19/174* (2014.11); *H04N 19/40* (2014.11); *H04N 19/46* (2014.11); *H04N 19/88* (2014.11); *H04N 21/2343* (2013.01); *H04N 21/4728* (2013.01)

(56) References Cited

U.S. PATENT DOCUMENTS

| | | | | |
|---|---|---|---|---|
| 2013/0101035 A1* | 4/2013 | Wang | ...................... | H04N 19/70 375/240.12 |
| 2014/0307775 A1* | 10/2014 | Ouedraogo | ............ | H04N 19/17 375/240.02 |
| 2015/0023407 A1* | 1/2015 | Sato | ........................ | H04N 19/55 375/240.02 |
| 2015/0103926 A1* | 4/2015 | Hannuksela | ......... | H04N 19/187 375/240.26 |
| 2015/0201202 A1* | 7/2015 | Hattori | ................... | H04N 19/70 375/240.02 |
| 2015/0208095 A1* | 7/2015 | Schierl | ............... | H04N 21/4728 375/240.28 |
| 2015/0208103 A1* | 7/2015 | Guntur | ................. | H04N 19/436 725/61 |
| 2016/0105690 A1* | 4/2016 | Denoual | ................ | H04N 19/46 375/240.02 |
| 2016/0135321 A1* | 5/2016 | Korikawa | ............ | H05K 5/0021 361/724 |
| 2016/0255354 A1* | 9/2016 | Yamamoto | ........... | H04N 19/103 375/240.12 |
| 2016/0286226 A1* | 9/2016 | Ridge | .................... | H04N 19/50 |
| 2017/0134756 A1* | 5/2017 | Denoual | ............ | H04N 21/8455 |
| 2017/0346873 A1* | 11/2017 | Denoual | ............... | H04N 19/70 |
| 2018/0007407 A1* | 1/2018 | Maze | ...................... | H04N 19/70 |
| 2018/0352219 A1* | 12/2018 | Maze | ................... | H04N 19/176 |
| 2019/0158935 A1* | 5/2019 | Denoual | ............. | H04N 19/188 |

FOREIGN PATENT DOCUMENTS

| | | |
|---|---|---|
| WO | 2015/197818 A1 | 6/2015 |
| WO | WO 2016/002496 | 1/2016 |

OTHER PUBLICATIONS

H. Schwarz, D. Marpe, & T. Schierl, "Block Structures and Parallelism Features in HEVC" (Jun. 2014) (Year: 2014).*

C. Yan, Y. Zhang, J. Xu, F. Dai, L. Li, Q. Dai, & F. Wu, "A Highly Parallel Framework for HEVC Coding Unit Partitioning Tree Decision on Many-core Processors", 21 IEEE Signal Processing Letters 573-576 (May 2014) (Year: 2014).*

K. Misra, A. Segall, M. Horowitz, S. Xu, A. Fuldseth, & M. Zhou, "An Overview of Tiles in HEVC", 7 IEEE J. of Selected Topics in Signal Processing 969-977 (Dec. 2013) (Year: 2013).*

C.C. Chi, M. Alvarez-Mesa, B. Juurlink, V. George, & T. Schierl, "Improving the Parallelization Efficiency of HEVC Decoding", 19 IEEE Int'l Conference on Image Processing 213-216 (Oct. 2012) (Year: 2012).*

C.C. Chi, M. Alvarez-Mesa, B. Juurlink, G. Clare, F. Henry, S. Pateux, & T. Schierl, "Parallel Scalability and Efficiency of HEVC Parallelization Approaches", 22 IEEE Transactions on Circuits & Sys. for Video Tech. 1828-1838 (Oct. 2012) (Year: 2012).*

European Search Report for European Application No. EP 16 18 7861, entitled "Partial Video Decoding Method, Device and System", dated Feb. 16, 2017.

Partial European Search Report for European Application No. EP 16 18 7861, entitled "Partial Video Decoding Method, Device and System", dated Feb. 27, 2017.

"Information technology—Coding of audio-visual objects—Part 15: Carriage of network abstraction layer (NAL) unit structured video in the ISO base media file format," C:\ Users\shinji_w\AppData\Roaming\Microsoft\ Templates\STD\ISO-IEC_14496-15_(E).doc STDVersion 2.2, 170 pages (2014).

"Technologies under Consideration for Dynamic Adaptive Streaming over HTTP23009," Parts 1, 3 and 4, International Organisation for Standardisation Organisation Internationale De Normalisation Iso/Iec Jtc1/Sc29/Wg 11 Coding of Moving Pictures and Audio, ISO/IEC JTC1/SC29/WG11 MPEG2016/N16223 Geneva, Switzerland, 32 pages (Jun. 14, 2016).

"HEVC tile subsets in 14496-15," International Organisation for Standardisation Organisation Internationale De Normalisation Iso/Iec Jtc1/Sc29/Wg 11 Coding of Moving Pictures and Audio, ISO/IEC JTC1/SC29/WG11 MPEG114/U7873, San Diego, USA, 8 pages (Feb. 17, 2016).

Ye-Kui Wang et al: "Viewport dependent processing in VR: partial video decoding", 115. MPEG Meeting; May 30, 2016-Jun. 3, 2016; Geneva; (Motion Picture Expert Group or ISO/IEC JTC1/SC29/WG11),No. m38559, May 25, 2016 (May 25, 2016), XP030066915.

Skupin R et al: "On MCTS extraction", 24. JCT-VC Meeting; May 26, 2016-Jun. 1, 2016; Geneva; (Joint Collaborative Team on Video Coding of ISO/IEC JTC1/SC29/WG11 and ITU-T SG.16 ); URL:http://wftp3.itu.int/av-arch/jct/c-site/,, No. JCTVC-X0039-v2,May 29, 2016 (May 29, 2016), XP030117967.

Banodkar D et al: "Multicast instant channel change in IPTV systems", Communication Systems Software and Middleware and Workshops, 2008. Comsware 2008. 3rd International Conference on, IEEE, Piscataway, NJ, USA, Jan. 6, 2008 (Jan. 6, 2008), pp. 370-379, XP031279706, ISBN: 978-1-4244-1796-4.

Kiran Misra et al: n Overview of Tilesin HEVC11 , IEEE Journal of Selected Topics in Signal Processing, vol. 7, No. 6, Dec. 1, 2013 (Dec. 1, 2013), pp. 969-977, XP055257475, us ISSN: 1932-4553, DOI.

Hannuksela M M et al: SO/IEC 14496-15:on extractor design for HEVC files11 , 114. MPEG Meeting; Feb. 22, 2016-Feb. 26, 2016; San Diego; (Motion Picture Expert Group or ISO/IEC JTC1/SC29/WG11),No. m37864, Feb. 18, 2016 (Feb. 18, 2016), XP030066230.

Aljoscha Smolic et al:Demonstration of a MPEG-4 Complient System for Omni-directional Video11 , 68. MPEG Meeting; Mar. 15, 2004-Mar. 19, 2004; MA1?4NCHEN; (Motion Picture Expert Group or ISO/IEC JTC1/SC29/WG11),,No. M10674, Mar. 9, 2004 (Mar. 9, 2004), XP030039502.

International Search Report for International Application No. PCT/EP2017/072665, entitled "Partial Video Decoding Method, Device and System" dated Mar. 15, 2018.

Karsten Gruneberg et al: HEVC ti tle Isubsets in 14496-15, 114. MPEG Meeting; Feb. 22, 2016-Feb. 26, 2016; San Diego; (Motion Picture Expert Group or ISO/IEC JTC1/SC29/WG11),No. m37873, Feb. 17, 2016 (Feb. 17, 2016), XP030066239.

(56) References Cited

OTHER PUBLICATIONS

Richardson, Ian G., "H.264 and MPEG-4 Video Compression Video Coding for Nextgeneration Multimedia," John Wiley & Sons Ltd, England (2003).
Text of ISO/IEC DIS 14496-15 4th edition11, 112. MPEG Meeting;Jun. 22, 2015-Jun. 26, 2015; Warsaw; (Motion Picture Expert Group or ISO/IEC JTC1/SC29/WG11),,No. N15479, Aug. 26, 2015 (Aug. 26, 2015).
S. Heymann et al: Representation, Coding and Interactive Rendering of High-Resolution Panoramic images and Video using MPEG-411, Proc. Panoramic Photogrammetry Workshop (PPW), Feb. 28, 2005 (Feb. 28, 2005), XP055034771, Berlin, Germany.
Yago Sanchez De La Fuente et al: Compressed Domain Video Processing for Tile Based Panoramic Streaming using SHVC11, Immersive Media Experiences, ACM, 2 Penn Plaza, Suite 701 New York NY 10121-0701 USA, Oct. 30, 2015 (Oct. 30, 2015) pp. 13-18.

\* cited by examiner

PARTIAL VIDEO DECODING METHOD, DEVICE AND SYSTEM

This application is the U.S. National Stage of International Application No. PCT/EP2017/072665, filed Sep. 8, 2017, which designates the U.S., published in English, and claims priority under 35 U.S.C. § 119 or 365(c) to European Application No. 16187861.6, filed Sep. 8, 2016. The entire teachings of the above applications are incorporated herein by reference.

FIELD OF THE INVENTION

The invention relates to a video information transmission method and system, to a video decoder a video encoder and methods of video encoding and decoding.

BACKGROUND

WO2015197818 discloses use of HEVC tiles to render video data from a user selectable spatial viewport to larger video images, such as panoramic video images, e.g. for display on a head mounted device. The HEVC standard (High Efficiency Video Coding) provides the use of tiles and slices to facilitate decoding of the video data using multi-core processors in the decoder system. Tiles correspond to respective spatial areas of video images, for which the video data is independently encoded. Thus different decoder units, running on different processor cores, may be assigned to decode different tiles (in HEVC terms, a unit that decodes a tile is called a "decoder", but as used herein the term "decoder" also covers a plurality of HEVC decoders for different tiles, and a decoder that decodes more than one tile). The frames of HEVC coded video may be partitioned in a spatial array composed of tiles where each tile contains at least one slice.

HEVC source devices may supply HEVC bitstream data via a network. A HEVC source device is usually little more than a file transfer server. At the request of a destination, the HEVC source device supplies a manifest file that enables the destination to generate flexible requests to transfer parts of the stored HEVC encoded bitstream data. The HEVC source device does not perform any HEVC dependent operations but simply transmits the requested parts that form a decodable video bitstream that can be decoded by any standard compliant decoder.

WO2015197818 makes use of the fact that tiles may allow for random access to spatial parts of the video frames. The document discloses the use of a spatial manifest file (SMF) with meta data about a subset of HEVC tiles, which is used for selective retrieval of tiles from the viewport and to configure the decoder system before it receives the requested tiled video data.

Storage and network transmission of HEVC video bitstream data involves a network abstraction layer (NAL). The HEVC video bitstream data is stored and transmitted in packets called NAL units. In advance of transmission of NAL units with video bitstream data, other NAL units are used to transmit parameter sets that apply to the video bitstream data. The parameter sets include picture parameter sets (PPS), sequence parameter sets (SPS) and video parameter sets (VPS). The parameter sets define, among others, the picture size, the dimension of the tile set and slice segment addresses. Each NAL unit with video data contains header data and payload data. In terms of the HEVC standard definition, the payload data of a NAL unit may contain video data preceded by a slice header. However, as used herein, the slice header will also be referred to as header data of the NAL unit. Thus header data are metadata and not video data. More so header data may include the NAL Unit header and the slice header. The header data, or at least part of the parameters in the header data, are encoded by means of a variable length code, so that the header length may change from slice to slice and frame to frame. The headers of NAL units with video bitstream data directly or indirectly indicate the parameter sets that apply to them. A parameter set may be used to initialize (configure) a decoder. A parameter set is thus metadata used by the decoder. The parameter set may be provided to the decoder as part of the HEVC bit stream (e.g. in the form of non VCL NAL units in case of HEVC). Alternatively the parameter set or sets may be provided in an alternative bit stream, or as SEI messages, or via an alternative interface of the decoder. As long as the parameter set is provided prior to the video data to which it applies. Thus a HEVC compliant bit stream may only contain NAL units carrying video data, but not parameter sets. A picture parameter set (PPS) that is referenced in the slice header (e.g. by means of picture parameter set ID) inside a NAL unit may in turn reference a sequence parameter set (e.g. the picture parameter set includes a sequence parameter set ID) which in turn may refer to a video parameter set that applies to a NAL unit.

When only video data from a selected viewport is rendered, which contains video data only from a limited number of tiles of larger HEVC data, a derived HEVC stream may be used for network transmission, with only the required tiles. The network source transmits the derived HEVC bitstream to the network destination for which the viewport has been selected, which requires less network bandwidth than transmission of a stream with the original full HEVC bitstream data. Decoding the video data related to the viewport at the resolution of the original HEVC source stream may result in images that have a pixel region corresponding to the viewport, but that also have a pixel region that is (dependent on the decoder) artificially completed with pixels of a certain value, as the decoder never received the encoded video data related to it. Therefore as only a portion of the original image is transferred and decoded, post-processing (after decoding) of the decoded video data may be required. This may involve cropping the view port pixel data from the raw image frame into a cropped image and thereafter resize it to the desired screen resolution. When the viewport selection for the network destination changes during rendering, the derived HEVC bitstream needs to be changed. The picture size may remain the same, but different tiles from the original HEVC bitstream data may have to be transmitted related to the difference between the first and the second viewport. The post processing needs to be adjusted in terms of cropping, as now a different region may need to be cropped. If the viewport change is the result of a user input, the retrieval of the additional one or more tiles, the decoding and the different post-processing steps all add up to the total delay experienced by the user. Especially in VR and/or 360 video related settings (e.g. wherein the rendering is performed on a head mounted display, and the user input would be for instance a measured head movement), and the tiles are retrieved from a distant location, such total delay is noticeable and readily unacceptable, leading to a decreased user experience and potentially nausea.

Another disadvantage arises when it comes to very high resolution source content. The technique presented in the prior art requires that the source content and the decoded content are of the same pixel resolution. In practice, the end-user devices are limited in their capacity to decode video up to a certain pixel resolution, independently from their screen resolution. This limitation is due to the hardware video decoder being able to decode a certain amount of pixels per seconds. On the other hand, it is common for camera and capture equipment to be able to produce content in a higher resolution that the end-user devices. As a result, there is need in the state-of-the-art to enable the decoding of video data in native resolution by video decoders limited to a lower resolution that the one of the entire source content. This way, the end-user can perceive a higher video quality which provides a higher quality of experience.

SUMMARY

Among others, it is an object to facilitate decoding of partial video images in a viewport Among others, it is an object to reduce the decoding and rendering delay when the displayed viewport changes.

A method according to claim 1 is provided. Herein previously prepared information such as meta data is used to control partial rewriting of header data in the network abstraction layer (NAL) units for a sub-array of slices, to make the NAL units consistent with a video stream that codes video data only for the sub-array of slices. In other words the rewriting generates rewritten network abstraction layer units that form a second video stream, preferably a second HEVC bitstream, that are decodable on the basis of said video codec into partial video images.

Encoded video data representing partial video images can thus be decoded from the partially rewritten bitstream using a standard decoder. Instead of, or in addition to, use of meta data, the previously prepared information may comprise a plurality of stored versions for different sub-array sizes.

In an embodiment the location in the header that is rewritten comprises an indication of the spatial location of one or more slices of a respective network abstraction layer unit, said indication preferably being an address of a slice header. The spatial location of a slice determines its position (or location) in an image frame that is the output of a decoding process. The indication that is present prior to the rewriting process, relates to a position of a slice in the image region of a video image (frame) of the source bitstream. By changing the original indication into a new indication, the sub-array of slices can be decoded, whereby each slice (or more precisely the sub region represented by the video data of the slice) is positioned at its intended new location in the partial image.

In an embodiment wherein the spatial-array being associated with a first picture size, prior to said decoding, the decoder being initialized for a second picture size, wherein said second picture size is smaller than said first picture size. In this embodiment, it is crucial to rewrite the indications of the spatial locations to indications corresponding to spatial locations of that of the sub-array. As the picture size for the decoder is set smaller than the picture size of the original (first) video bitstream, the decoder would no longer be able to handle the original indications. In that case the decoder will no longer be able to decode the (encoded video data of the) received NAL units. In an embodiment, the partial images can be used to provide a viewport on the full video data, by displaying a stream of video images that correspond to a part of the full encoded video images at locations defined by means of the viewport. In this embodiment, the sub-array of slices includes the slices that contain video content data for all the locations in the viewport.

In an embodiment, the rewriting may involve changing the position of a part of the header data relative to a starting point of the NAL unit, e.g. after a location where a parameter such as the indication of the spatial location of the slice (e.g. a slice address) has been rewritten with an altered bit length in the header. The altered bit length is due to an altered indication of the spatial location of the slice, e.g. a different slice address. At the end of this part of the header, padding bits may be added or removed to ensure alignment of subsequent video data at a multi-bit word boundary. To change the position of this part of the header data and to add or remove padding bits, the length of the header must be known. The length of the header may differ for different NAL units in the same stream, dependent on the data, such as in HEVC encoded bitstreams.

Determining the length of the header from the original NAL unit would involve significant additional computation effort. Use of meta data that indicates the length of the header, directly or indirectly by indicating the position of the start of the video content data or the starting point of the padding bits significantly reduces the time and complexity needed for partial rewriting.

For example, in an embodiment, values of the indications of the spatial location of the slices in the NAL units for the sub-array of slices may be replaced, using a predetermined set of shortened values of the indications of the spatial location of the respective slices that distinguish positions of these slices within the sub-array, without indicating the position of the slices in the full video images. The respective locations in the header data of the NAL units, where to rewrite these indications of the spatial location of the respective slices, may be indicated by the meta data for each of the respective NAL units individually. But if the location in the header data used for rewriting is the same for all individual NAL units related to the selected sub-array, a (single) predetermined location may be used.

In an embodiment, the meta data for each NAL unit comprises one or more key-value pairs, wherein the value indicates a bit offset from the start of said header data of the NAL (Network Abstraction Layer) unit and the key indicates to which of the parameters or the padding in the header of the network abstraction unit, the value applies. The rewriting of the indicated parameter or padding may then be performed according to the indicated bit offset.

In an embodiment the meta data for each NAL unit for each respective one of the slices may be transmitted together with that NAL units, e.g. as part of a file wrapper that contains both the NAL unit for the respective one of the slices and the meta data that applies to it.

In an embodiment, the meta data may be comprised inside one or more SEI messages, preferably a HEVC based SEI message.

In an embodiment a SEI message comprising meta data about an indication of a spatial location of a slice of a network abstraction layer, NAL, unit, is being received by a decoder apparatus or decoder device prior to rewriting a header in said respective NAL unit, said SEI message preferably being part of said second video bitstream.

In another embodiment the meta data file is being received out of band. For instance the binary encoded meta data file may be transmitted in the HTTP header from the network source system to the network destination system in response to a HTTP GET request command from the network destination system to start a partial HEVC stream containing the indicated selection of slices. In yet another embodiment the meta data can be formatted using the JSON-data format and transmitted using for example any of the transport protocols as mentioned above between the network destination system and network source system.

In the embodiment wherein the previously prepared information comprises a plurality of stored versions for different sub-array sizes, the version to be obtained for use in decoding may be selected according to size of the sub-array of slices. In an embodiment, parameters in such a selected version are rewritten dependent on the selected sub-array. The versions may be designed so that the parameter or parameters that need to be rewritten are only parameters that can be rewritten based on predetermined information on position in the NAL that is the same for all NAL units, so that no meta data for individual NAL units needs to be provided. In a further embodiment the versions may be designed so that no parameters at all need be rewritten before decoding.

In an embodiment wherein the selected sub-array can be changed, the method may comprise defining a map of values of the indications of the spatial location of the slices in the spatial array to target values of the indications of the spatial location of the slices in the selected sub-array for use to rewrite the indications of the spatial location of the slices in the NAL units for the sub-array of slices.

In an embodiment post-processing may be used to rearrange the decoded partial video images to re-position image blocks that correspond to the slices of the new sub-array in a spatial sequence that corresponds to their spatial sequence in the spatial image.

When the selection of the sub-array is changed, the target values of the indications of the spatial location of the slices in said map for slices that belong to an overlap between the new sub-array and the previous sub-array may be kept, whereas the map may be redefined for target values of the indications of the spatial location of the slices for the newly selected sub-array of slices that do not belong to the overlap. In this way decoding of slices in the overlap need not be interrupted by the change of the sub-array.

In an embodiment, the decoding comprises decoding slices of the new sub-array that do not belong to the overlap for successive frames using I-frames from an I-frame only version of the stream. This makes it possible to decode slices immediately after the change. Once the inter frame relation based version of the stream contains a new group of pictures a switch may be made to the inter frame relation based version of the stream.

The method is particularly suitable for use with transmission of the network abstraction layer units from a remote network source system, wherein the number of transmitted slices can be reduced to slices from the sub-array.

In an embodiment the network source system may transmit the meta data as well as network abstraction layer units for the slices in the sub-array. In this case, the rewriting may be executed by a network destination system. In another embodiment, at least part of the rewriting may be performed in the network source system based on the meta data and the rewritten network abstraction layer units are transmitted. In another embodiment, alternate (partially) rewritten versions of the headers of the network abstraction layer units are stored for all slices of the full video data, each for a different dimension of the sub-array, e.g. as part of alternate versions of the network abstraction layer units. In this embodiment, a version of the header selected based on the dimension of the selected sub-array may be transmitted for the slices in the sub-array.

The source system may be configured to receive a first indication of a selection of the sub-array and to cause network abstraction layer units for the selected sub-array in the first video stream to be retrieved from a storage system and to be transmitted. In a further embodiment, the controller is configured to receive an indication of selection of a new sub-array of a spatial array. After the change to the new sub array network abstraction layer units comprising data from a stored I-frame only version and a stored inter frame relation based version for outside and with an overlap between the previous sub-array and the new sub-array respectively. This is done until a frame where a new group of pictures starts in the inter frame relations based version. Subsequently the inter frame relation encoded version may be used for all slices.

According to an aspect, a computer readable medium or storage system is provided, comprising stored network abstraction layer units that, when processed by a video stream decoder, will cause the video bitstream decoder to generate of a video stream that encodes full video images divided into a spatial array of independently decodable slices, wherein the network abstraction layer units each contain video data for a respective one of the slices preceded by a header that comprises parameters relating to the respective one of the slices in relation to the first video stream, the computer readable medium storing meta data indicating the bit offset of parameters and/or padding bits in the headers of respective ones of the network abstraction layer units.

In an embodiment of the computer readable medium or storage system the meta data for each of the respective ones of the network abstraction layer unit comprises one or more key-value pairs, wherein the value indicates a bit offset from the start of said header data of the network abstraction unit and the key indicates to which of the parameters or the padding in the header of the network abstraction unit applies.

In an embodiment of the computer readable medium or storage system each of the respective ones of the network abstraction layer units is stored wrapped together with the meta data for that respective ones of the network abstraction layer units.

An embodiment of the computer readable medium or storage system comprises network abstraction layer units of a first and second version of the video stream, the first version comprising inter frame relation based image data and the second version comprising only data encoded independent of inter frame relations.

An embodiment of the computer readable medium or storage system comprises stored versions of the network abstraction layer units from a plurality of versions for different sub-array sizes.

BRIEF DESCRIPTION OF THE DRAWING

These and other objects and advantages will become apparent from a description of exemplary embodiments with reference to the following figures

DETAILED DESCRIPTION OF EXEMPLARY EMBODIMENTS

For the purpose of the invention, the term video stream, when comprising encoded video data relates to a bitstream that is the intended input of a decoder apparatus. E.g. the bitstream is intended to be parsed for the purpose of decoding the encoded video data embedded in it. This interpretation is in line with what is understood in the technical field of encoding by the term "bitstream".

Figure 1:
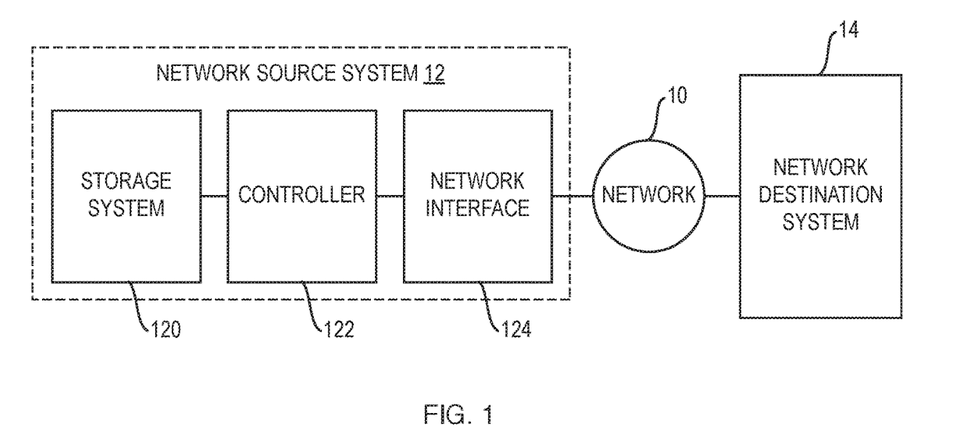
FIG. 1 shows a video transmission system

FIG. 1 shows an exemplary video transmission system, comprising a network 10, a network source system 12 and a network destination system 14. Network source 12 comprises a storage system 120, a controller 122 and a network interface 124. Storage system 120 stores data representing a coded video stream. By way of example, the coded video bit stream may be a HEVC coded video bitstream. HEVC uses slices, which are parts of the video stream that are encoded independent of each other. In the described embodiments the slices are used so that each slice is associated with a respective spatial location (of a subregion) in the images. A HEVC coded video bitstream comprises slice headers and video content data. Controller 122 is coupled to storage system 120, for retrieving HEVC bitstream data from storage system 120, and to network interface 124 for receiving commands via network interface and for supplying HEVC bit-stream data to network interface 124 in response. Network interface 124 is a network transmitter coupled to network 10.

Figure 2:
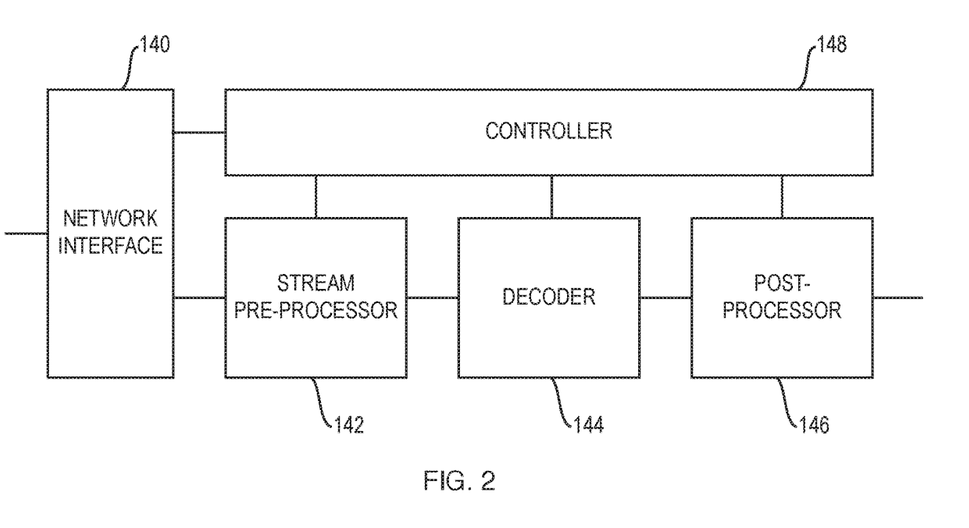
FIG. 2 shows a decoder system

FIG. 2 shows an exemplary network destination system 14. Network destination system 14 comprises a network interface 140, a stream pre-processor 142, a decoder 144, a post-processor 146 and a controller 148. Network interface 140 has an input to network 10 and an output coupled to an input of stream pre-processor 142. Stream pre-processor 142 has an output coupled to an input of decoder 144. Decoder 144 has an output coupled to an input of post-processor 146. Post-processor 146 may be configured to shuffle (re-arrange) the positions of blocks of pixels in the decoded image received from decoder 144. Post-processor 146 has a video output, which may be coupled to a video display device such as an LCD screen (not shown) or to further video processing units (not shown). Controller 148 is coupled to network interface 140 and controller 148 has control outputs coupled to control inputs of stream pre-processor 142, decoder 144 and to post-processor 146.

A HEVC coded bitstream may comprise encoded parameter sets, slice headers and video content data. The parameter sets are located in SPS and PPS NAL units. Among others, the parameter sets define the picture size and the numbers of rows and columns of tiles in the pictures (each tile contains at least one slice). Each NAL unit with video data for a slice contains a header and payload data. In terms of the HEVC standard, the payload data contains encoded video content data preceded by a slice header, i.e. the data of slices is composed of a slice header and a slice payload. But herein the slice header will also be referred to as header data, or more briefly "header". Headers, or at least part of the parameters in the header, are encoded by means of a variable length code, which means that the total header length of the header may change from slice to slice and frame to frame.

Among other things, according to an embodiment of the invention, the slice header contains an identification of the slice that is encoded in the NAL unit (this may be referred to as the slice (segment) address, and is an example of an indication of a spatial location of the slice), a flag that indicates whether the slice is the first (top-left) slice in a picture, a temporal sequence number of the picture to which the slice belongs, the reference picture set used for intra slice coding and a quantization delta with respect to the reference picture set. The identification of the slice may be represented by the number of the first coding tree block in the slice in a coding tree block raster scan of a picture. The HEVC standard uses the concept of tiles. Each image of the video stream can be partitioned into a matrix of these tiles. When each tile contains exactly one slice, each slice may be associated with a respective spatial location (of a region) in the images and by means of this association the slices may form a spatial array of independently decodable slices. The same applies when each tile contains a plurality of slices. As a result, the identification of the slice in the NAL unit forms an (indirect) indication of the spatial location of the slice. When each tile comprises one slice, or more than one slice, it is possible to derive the spatial position of a slice in a frame from the identification of the slice (the identification of the slice can be the slice address, which according to HEVC would be the address of the first CTB (Coding Tree Block) of a slice). It should be emphasized that the indication of the spatial location of the slice may be a direct indication or an indirect indication. An example of a direct indication is as a set of coordinates of a location such as a corner of a rectangle in the image that contains video data encoded in the slice. Indirect indications are indications from which such direct indications can be derived, if need be with the aid of additional information.

For example in an embodiment of the invention wherein a video image (frame) is partitioned in tiles, whereby each tiles contains one slice, from the tile set dimensioning and the slice address, the spatial location of each slice (e.g. the region of the video image (frame) occupied by the video data of the slice) can be easily determined. At the end of the header and before the video content data the NAL unit contains zero, one or more padding bits (also called stuffing bits), the number of padding bits being selected to ensure word boundary alignment (e.g. byte alignment) of the start of the video content data, irrespective of the header bit length produced by the variable length encoding of the header. The number of padding bits is selected so that the sum of the bit length Lh of the header plus the number N of padding bits is an integer multiple of the word length W (e.g. W=8), preferably with N<W.

In addition to the HEVC coded bitstream, storage system 120 stores meta data that indicates the location of the padding bits in the slice headers and optionally the location (e.g. offset in bits from the start of the NAL unit) and length of one or more fields in the slice headers. The indicated fields may include any one of the fields for the representation of the spatial location of the slice, the flag that indicates whether the slice is the first slice, the temporal sequence number of the picture to which the slice belongs, the indication of the reference picture set used for intra slice coding and the quantization delta with respect to the reference picture set. The meta data may also indicate the location and length of certain fields in the encoded parameter sets. The meta data may be generated when the stream is encoded, by adding different headers before the same encoded video data, or later by parsing the encoded stream to determine the location of different parameters in the NAL units and/or the number of padding bits. The meta data may be compiled in advance, before the location of a requested sub-array is known (i.e. non-real time).

In an embodiment the meta data, preferably in the form of a meta data file, comprises key-value (or name-value or attribute-value) pairs of the parameters of the header data. These may include one or more attributes indicating parameters and an attribute value indicating the positions by means of an offset in bits from the start of the video data. The meta data file may be binary encoded. In an embodiment the meta data may be stored as separate meta data files that each contains meta data for one or more NAL units. In an embodiment each NAL unit may be stored with a file wrapper that contains the meta data for the NAL unit. A wrapper may be placed around a binary encoded meta data file and the corresponding NAL unit, for instance using Google Protobuf.

Preferably, the stored video data in storage system 120 also contains a full I-frame encoded version of the video data and an encoded version based on inter frame relations (i.e. using a combination of I-frames and motion predicted frames organized in a Group Of Pictures).

In operation, network source system 12 transmits a partial HEVC bitstream, containing parameter sets of the stored HEVC bitstream, and NAL units representing a sub-array of selected slices rather than all slices of the stored HEVC stream. The number of slices in the sub-array is smaller than the number of slices in the images that are encoded by the HEVC bitstream. Both its height and width in terms of numbers of slices may be smaller than the height and width in terms of numbers of slices of the images encoded by the HEVC bitstream.

The network source system 12 may be configured to operate basically either as a file server that merely transmits data requested by a network destination system, or as an active video stream source which compiles data to be transmitted based on parameters provided by the network destination system, e.g. defining a sub-array size and location. For operation as a file server, the HEVC bitstream may be stored in the form of known MPEG DASH (hereafter simply referred to as DASH) segments for example. In that case additional metadata related to MPEG DASH is added to the HEVC bitstream (e.g. the HEVC bitstream is encapsulated such that parts of it may be retrieved using the MPEG DASH protocol). Furthermore a manifest file called Media Presentation Description (MPD) may be stored in network source system 12. This manifest file comprises the URLs of the DASH segments, for use to enable network destination system 14 to request selected DASH segments from network source system 12.

In another embodiment that supports operation as a file server, the HEVC bitstream may be stored as Transport Stream packets or MP4 file segments (the latter for example in the form of a fragmented MP4 file). In this case storing it in a further format usually encompasses adding metadata related to such format. A HTTP Live Streaming (HLS) playlist file comprising the URLs of the HLS segments (fragments) may be stored in network source system 12. HLS playlist files are known per se. The HLS playlist file comprises the URLs of the HLS segments.

Figure 3:
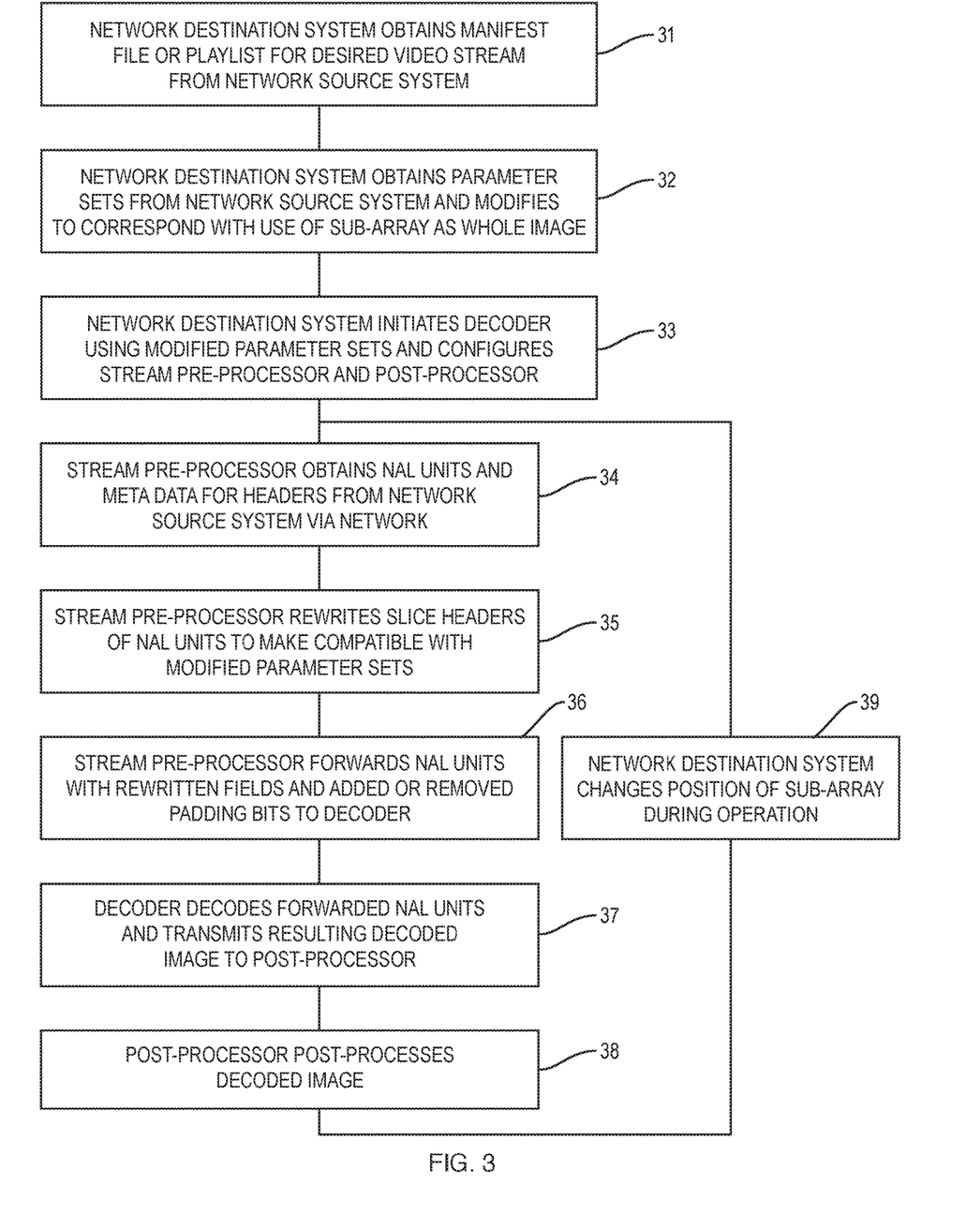
FIG. 3 shows a flow chart of a process at the destination system
Figure 4:
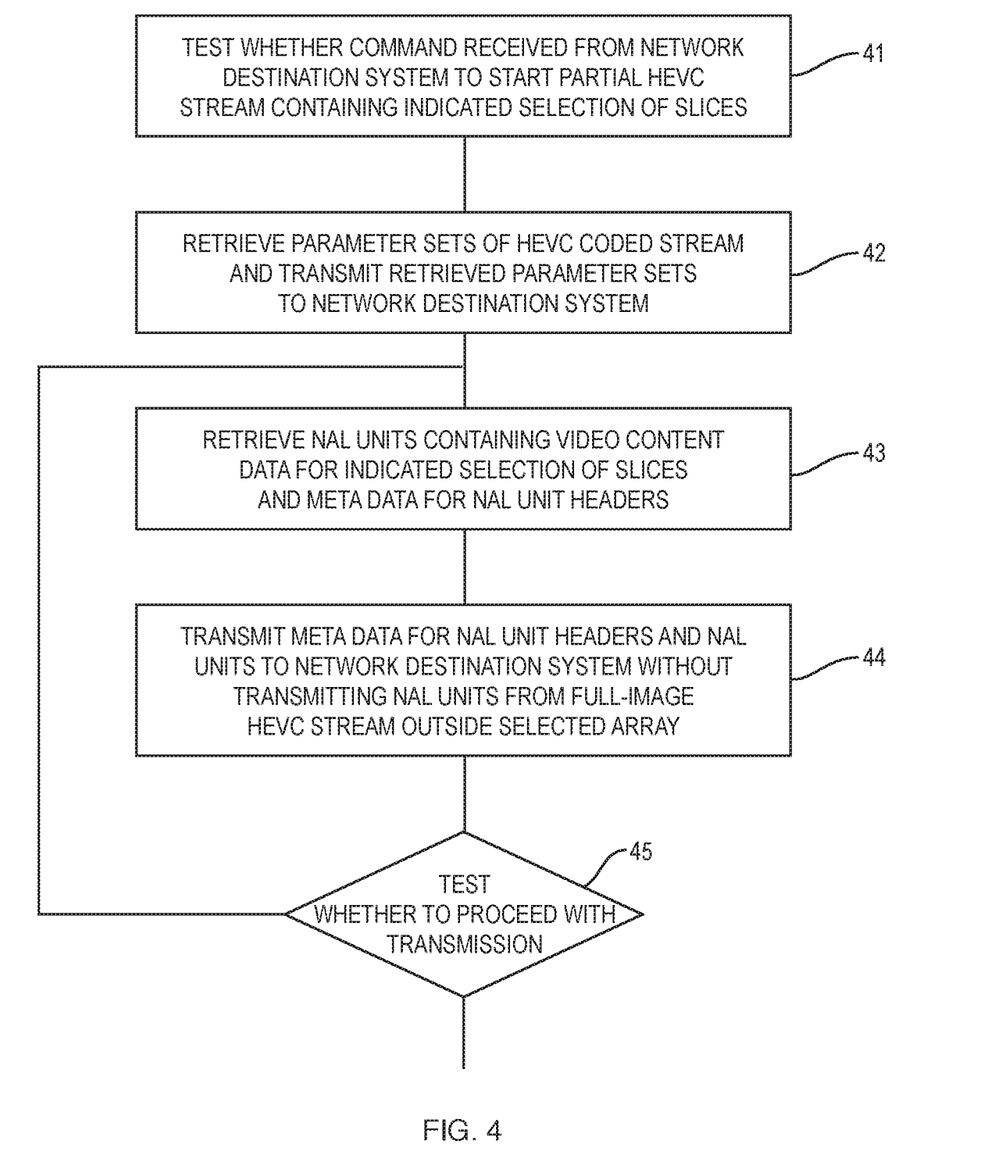
FIG. 4 shows a flow chart of a process at the source system

FIGS. 3 and 4 show a flow-charts of operation of network destination system 14 and network source system 12. An embodiment will be described wherein the destination system uses the network source system as a file server, for obtaining encoded video information for a sub-array of slices. Herein the network destination system obtains information e.g. by providing the controller so that it is configured to transmit requests specifying the information to the network source system and receiving the specified information at the pre-processor in response to such requests. NAL units may be obtained for example as DASH segments, Transport Stream packets or MP4 file segments specified e.g. by indicating their URLs based on a manifest file, playlist etc.

The flow-chart of FIG. 3 may be part of a process wherein a sub-array of slices is selected, e.g. based on user controlled navigation or another form of external control of the selection of the location of the sub-array and possibly its size. For example detection of an orientation of a head set may be used to select the location based on signals from one or more orientation sensors. In a first step 31 of the flow-chart of FIG. 3, the network destination system obtains a manifest file or a playlist for a desired video stream from the network source system. In a second step 32 of the flow-chart of FIG. 3, the network destination system (e.g. its controller) obtains parameter sets from the network source system and modifies them to make them correspond with use of the sub-array as the whole image. The network destination system 14 makes the stream HEVC compatible with use of a sub-array of the whole image by modifying the parameter sets to set the picture size and the numbers of rows and columns of tiles in the pictures in correspondence with the selected sub-array. In a third step 33, the network destination system (e.g. its controller) initiates decoder 144 of network destination system 14 using the modified parameter sets to initiate the decoder.

Furthermore, the controller may configure the stream pre-processor and the postprocessor in third step 33. The stream pre-processor is configured to modify received NAL units from the network source system in correspondence with the modified parameter sets. The stream pre-processor may be configurable to map received indications of spatial locations of the slices from the original full size HEVC image to indications of the spatial location of the slices in images with a size of the sub-array. In an embodiment, the stream pre-processor may comprise a configurable mapping table that defines this mapping for individual indications of the spatial location of the slices, e.g. containing indication of the spatial location of the slice in a full image in table entries for each slice in the sub-array. For reasons that will be described later, the stream pre-processor and the postprocessor may be configured to apply configurable tile mappings. The stream pre-processor may be configurable to map received indications of the spatial location of the slices in an 'out-of-spatial-order' way. The postprocessor may be configured to map different tiles from the decoded image in different ways 'out-of-spatial-order' to positions in the output image, so as to restore their original order from the full image. The postprocessor may comprise a configurable mapping table for this purpose, e.g. containing addresses of image blocks in the decoded image in table entries for blocks in the output image, or addresses of block corner locations of the output image in table entries for blocks in the decoded image.

Decoded images from decoder 144 and post-processed output images from postprocessor 146 may be distinguished. In an embodiment, postprocessor is configured to obtain the output images from the decoded images not just by remapping indications of the spatial location of the slices, but also by deriving output images that correspond to cropped sub-images of the remapped decoded images. The controller may configure the position of the cropping window to be used by postprocessor 146. Optionally, the stream pre-processor and the postprocessor may be arranged to apply a configurable rotation between the area in the decoded image from which the output image must be extracted, after the remapping the indication of the spatial location of the slice. In this case the controller may configure the rotation angle as well.

In a fourth step 34, the stream preprocessor obtains NAL units and meta data for the headers of these NAL units from the network source system via the network. In a fifth step 35, the stream pre-processor rewrites the slice headers of the NAL units to make them compatible with the modified parameter sets. The stream pre-processor replaces the addresses of the slices by shortened indication of the spatial location of the slice, from a predetermined set of shortened addresses. Herein the predetermined set of shortened addresses depends on the dimensions of the sub-array (which may be predetermined or not) and the predetermined set of shortened addresses is predetermined in the sense that it does not depend on the position of the sub-array in the full video images, so as to produce indications of the spatial location of the slices within the sub-array as configured by the controller e.g. in the mapping table. The stream preprocessor rewrites the flag that indicates whether the slice is the first slice for one of the transmitted slices.

Also the stream pre-processor may change the position of unmodified parts of the slice headers relative to the start of the NAL unit in order to account for field length modifications corresponding to the use of the sub-array (the smaller size of the sub-array may imply use of fewer bits for indications of the spatial location of the slices). Furthermore, the stream pre-processor adds or removes padding bits to ensure byte alignment of the NAL data behind the slice headers, when this is necessary due to the shifting.

Stream pre-processor 142 uses the location of the padding bits from the meta data (e.g. signaled through the metadata) to determine the locations in the NAL units where the padding bits are added or removed. Stream pre-processor 142 may also use indications of locations of the relevant fields from the meta data to select the locations where the data is modified and/or where shifts are started. Alternatively, stream pre-processor 142 may use predetermined indications of one or more of the field locations and/or sizes to select the locations. This is possible because at least some of these are the same for all slice headers.

In a sixth step 36, the stream preprocessor forwards the NAL units with the rewritten fields and added or removed padding bits to the decoder. In a seventh step 37, the decoder decodes the forwarded NAL units and transmits the resulting decoded image to the post-processor. In an eight step 38, the post-processor post-processes the decoded image.

In an embodiment the process may repeat from fourth step 34 after eight step 38. However, FIG. 3 illustrates an embodiment wherein the process contains a ninth step 39, wherein network destination system 14 is able to change the position of the sub-array during operation.

The network source system may transmit the meta data separately from the corresponding NAL units or in-band with the NAL units, for example as part of a wrapper files. In an embodiment, the meta data may be transmitted inside an HEVC SEI message for each respective NAL unit. In another embodiment the meta data file is transmitted out of band. For instance the binary encoded meta data file may be transmitted in the HTTP header from the network source system to the network destination system in response to a HTTP GET request command from the network destination system to start a partial HEVC stream containing the indicated selection of slices. In yet another embodiment the meta data can be formatted using the JSON-data format and transmitted using for example any of the transport protocols as mentioned above between the network destination system and network source system.

FIG. 4 illustrates the operation of the network source system in the alternative embodiment wherein the network source system is an active video stream source. In this embodiment, the steps wherein the network destination system obtains information need not all involve a request transmitted to the network source system. In this embodiment, first step 31 of the flow-chart of FIG. 3 comprises transmitting a command to start the (transmission of the) partial HEVC stream, indicating a selection of slices, e.g. in terms of the location of the two dimensional sub-array of slices within the images coded by the HEVC coded stream. Preferably, the command also indicates the height and width of the array in terms of numbers of slices. Alternatively, a predetermined height and width may be used, e.g. 3×3 slices. Furthermore, the command may comprise an identification of the stream and optionally a starting time location in the stream. Alternatively, the command may apply to a predetermined stream, or the identification of the stream may be provided in a separate command.

In a first step 41 of the flow-chart of active stream operation of FIG. 4, the network source system tests whether it has received the command from the network destination system to start a partial HEVC stream containing the indicated selection of slices. If so, the network source system proceeds to a second step 42, wherein it retrieves the parameter sets of the HEVC coded stream and transmits the retrieved parameter sets to the network destination system.

Subsequently, the network source system proceeds to a third step 43, wherein it retrieves the NAL units that contain the video content data for the indicated selection of slices and the meta data for the headers of these NAL units. Next, the network source system proceeds to a fourth step 44, wherein it transmits the meta data for the headers of these NAL unit and the NAL units to the network destination system via the network, without transmitting NAL units from the full-image HEVC stream outside the selected array. In a fifth step 45, the network source system tests whether it should proceed with transmission. If so, the network source system repeats the process from third step 43.

Slice Remapping

The controller of network destination system 14 may be configured to check whether there is a need to change the position of the output image relative to the full image of the HEVC stream and optionally whether its rotation needs to be changed. This may be needed for example in response to a user command or detected movement of a head set that is used to display the image.

In a ninth step 39, the controller determines whether the position and optionally rotation change necessitates a change of the sub-array, i.e. whether the changes have moved any part of the image outside the sub-array. If so, the controller changes the selection of slices for which it will obtain NAL units in fourth step 34.

Figure 5:
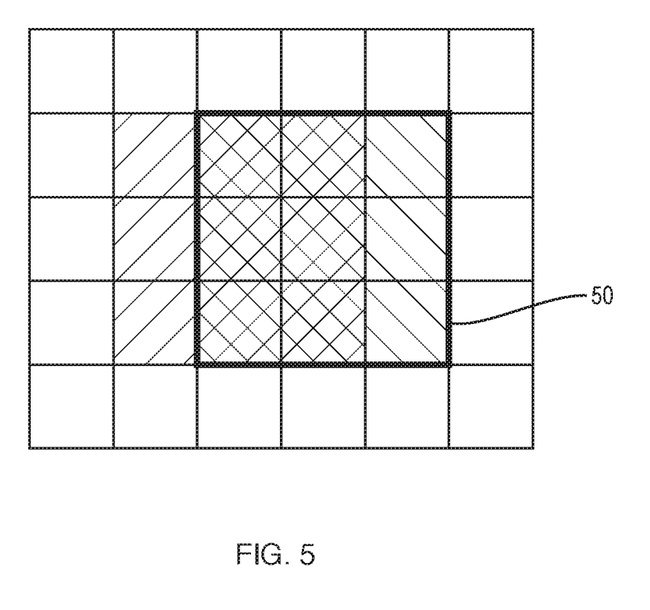
FIG. 5 illustrates sub-array overlap

FIG. 5 illustrates an embodiment that also involves a change of the address mapping that is performed by the stream pre-processor. This may be used to ensure temporal continuity in the stream of slices as much as possible. Furthermore it may be used to avoid or minimize use of additional bandwidth from the I-frame only video stream after changing the sub-array. When the controller selects a new sub-array of slices 50, the new sub-array may partly overlap with the previous sub-array at a number of slices indicated by cross-shading. To ensure temporal continuity of operation of the decoder (i.e. the ability to use decode slice data by references to earlier slice data) it is desirable that the remapped indications of the spatial location of the slices of the (cross-shaded) slices in the overlap do not change, and that the slices that are new in the new sub-array of slices 50 (indicated by a first type of single shading) are remapped to addresses of slices from the previous sub-array that are not used in the new sub-array 50 (indicated by a second type of single shading).

Thus for example, if a row of the slices in the previous sub-array have addresses corresponding to two-dimensional slice coordinates (n,n), (n+1,n), (n+2,n), these may be mapped to shortened indications of the spatial location of the slices corresponding to two-dimensional slice coordinates (0,0), (1,0), (2,0) in the rewritten stream supplied to the decoder. When the new sub-array is shifted by one slice to the right from the previous sub-array i.e. wherein a row of slices have addresses in the full image corresponding to two-dimensional slice coordinates (n+1,n), (n+2,n), (n+3,n), these may be mapped to shortened indications of the spatial location of the slices corresponding to two-dimensional slice coordinates (1,0), (2,0), (0,0) in the rewritten stream respectively, so that full stream indications of the spatial location of the slices corresponding to two-dimensional slice coordinates (n+1,n), (n+2,n) remain mapped to rewritten addresses corresponding to two-dimensional slice coordinates (1,0), (2,0).

However, this form of address mapping has the effect that the slices will turn up spatially out of order in the decoded image. This is corrected by the postprocessor. The postprocessor provides for configurable mapping of slices from the decoded image to ensure that the slices appear in the output image in their order according to the full image. Thus, in the preceding example, the slices of a row at shortened addresses corresponding to two-dimensional slice coordinates (0,0), (1,0), (2,0) in the decoded image are mapped to shortened addresses corresponding to two-dimensional slice coordinates (2,0),(0,0), (1,0) in the output image of the post-processor.

To implement this, in ninth step 39, the controller may reconfigure the stream pre-processor and the postprocessor to re-configure the desired mapping. In the re-configured mapping the slices in the overlap between the new and previous sub-arrays retain their mapped indication of the spatial location of the slice and the slices in the new sub-array outside the overlap are assigned indications of the spatial location of the slices of slices in the previous sub-array that lie outside the overlap. The mapping of tiles from the decoded image is re-configured to restore the spatial order according to the original (full-image) indications of the spatial location of the slices.

In addition, the postprocessor may subject the result of mapping to a further position shift to obtain the output image, e.g. to provide for sub-slice position shifts. Optionally, rotations may be provided for as well. In ninth step 39, the controller may re-configure the post-processor to perform output image adjustments according to such a position shift and/or rotation. These may be seen as a form of remapping, which may be occasioned by changes of the location of the output image relative to the full image, but it should be noted that not all adjustments of the position shift and/or rotation result in changes of the selected sub-array in the decoded image and hence to slice remapping.

In the embodiment wherein the network source system is an active video stream source, ninth step 39 may comprise transmitting a command to change the indicated selection of slices to network source system 12, to transmit a different set of slices and their corresponding meta data. In this embodiment, a fifth step 45 may be added to the flow-chart of FIG. 4, wherein the network source system tests whether it has received such a command and if so the network source system modifies the indicated selection of slices, so that the slices of the indicated selection of slices will be retrieved and transmitted in third step 43 and fourth step 44. For the purpose of synchronization, the network source system may include an indication in the meta data to mark the first image in which the modified indicated selection of slices applies.

I-Frame Only Substitution

In a further embodiment, an I-frame only version is transmitted temporarily of the slices of the new sub-array that lie outside the overlap with the previous sub-array. As is known per se, images forming a video stream can be encoded dependent or independent of any other image in the stream. An image that is encoded independent of any other image in the stream is referred to as an I-frame, a slice of such an image is referred to as an I-frame encoded slice and a representation (version) of a stream that is encoded with I-frames only is referred to as an !-frame only version of the stream. An image that is encoded dependent on one or more other images, e.g. by means of motion vectors relative to such an other image is referred to as an inter frame encoded image. A representation (version) of a stream that includes inter frame encoded images is referred to as an inter frame relation based representation or version of the stream. Such an inter frame relation based representation or version of the stream may also be referred to as an inter frame encoded representation or version of the stream. As is known per se, such a representation or version of the stream may also include I-frames, e.g. at the start of a group of pictures (GOP). Frames of a GOP can be decoded independent of other GOP's.

As noted, the stored video data in storage system 120 preferably contains a full I-frame encoded version of the video data as well as an encoded version based on inter frame relations (i.e. using a combination of I-frames and motion predicted frames organized in a Group Of Pictures, e.g. in terms of temporal relations such as motion vectors). Preferably, identical sets of reference images (reference picture sets) are used for both versions. In an embodiment, the stored stream may be created from an original stream by adding reference picture sets that are supersets containing the reference picture sets of both versions and modifying the references to the reference picture sets to references in the superset.

In a first embodiment, in fourth step 34 the network destination system obtains frames from the I-frame only version for slices of the new sub-array that lie outside the overlap with the previous sub-array. The I-frame only version of these slices may be obtained until a frame is reached where the inter frame relation based version contains an I-frame, after which frames from the latter may be transmitted. The controller of the network destination system may determine when this occurs, by keeping track of the position of frames in the transmitted group of pictures (GOP). Based on this the frame numbers can be used to determine the first frame of the next group of pictures, from which transmission of frames from the that inter frame relation based version is started. Preferably, the network destination system obtains the inter-frame encoded version for slices of the new sub-array that lie within the overlap with the previous sub-array. Alternatively, the I-frame only version may be obtained for all slices, but this increases bandwidth use.

Figure 6:
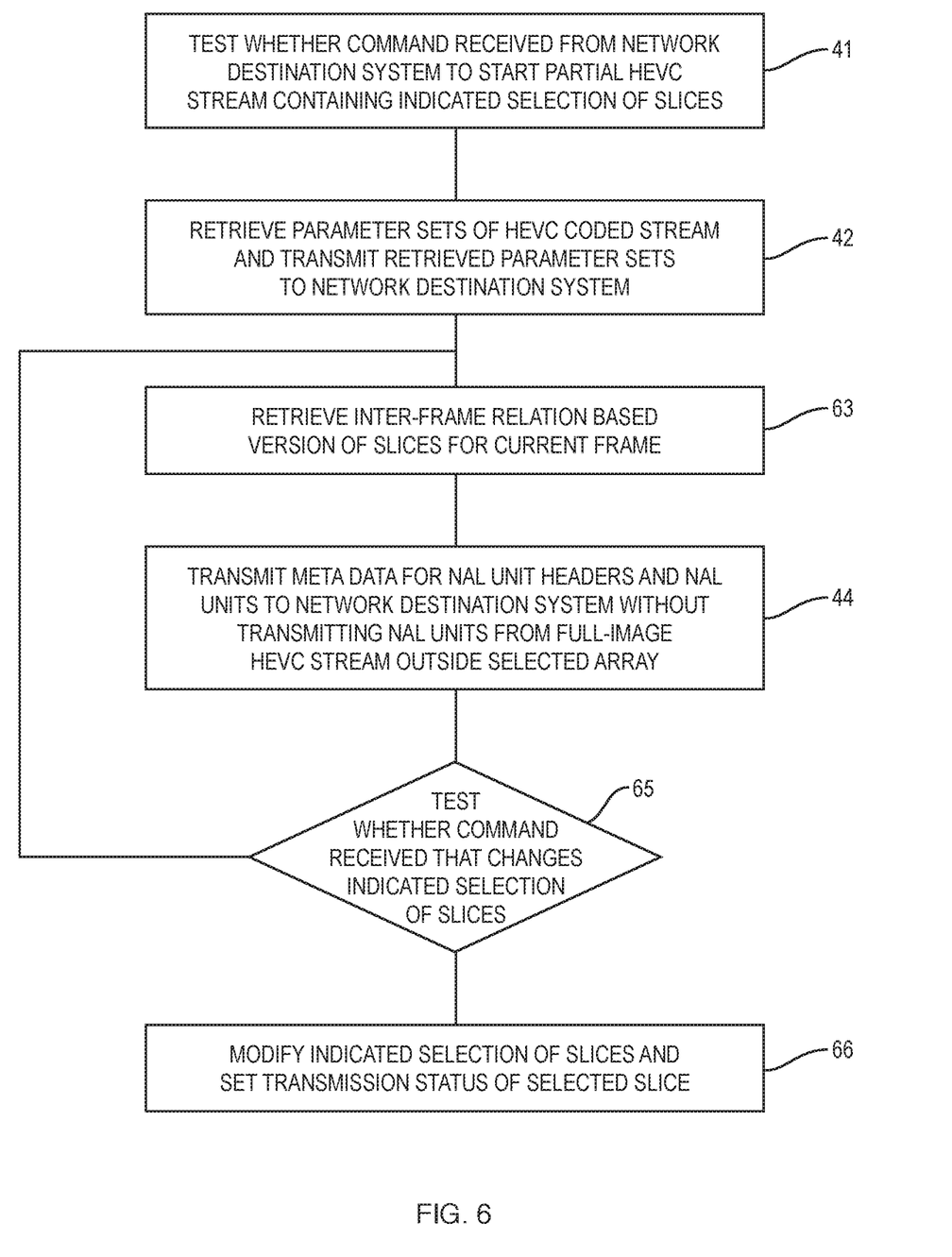
FIG. 6 shows a flow chart of a process at the source system

In the embodiment wherein the network source system is an active video stream source, the network source system may determine whether to send an I-frame only version or an inter frame relation based version for selected slices. FIG. 6 shows a flow-chart of the operation of the network source system in this embodiment. Steps that are identical to those in FIG. 4 are indicated by the same labels. Third step 43 of FIG. 4 has been replaced by a modified retrieval step 63.

In a fifth step 65, the controller of the network source system tests whether it has received a command that changes the indicated selection of slices. If so the controller executes a sixth step 66 in which it modifies the indicated selection of slices in a sixth step 66, and sets a transmission status of this slice. The transmission status is used to indicate whether the inter frame relation based version of the slice or the I-frames only version must be transmitted. Initially, the transmission status of each slice is set to indicate the prediction based version or the I-frames only version according to whether the slice is in the overlap between the new and the previous sub-array or not, respectively.

After sixth step 66, or after fifth step 65 when the indicated selection of slices has not changed, the process returns to modified retrieval step 63. In modified retrieval step 63, the controller of network source system retrieves the inter frame relation based version of the slices for the current frame. For slices for which the transmission status is set to I-frame only transmission, the controller tests whether the inter frame relation based version of the slices for the current frame contains an I-frame. For those slices for which this is the case, the controller sets the transmission status to transmission of the prediction based version. For the slices for which the transmission status is set to I-frame only transmission and the inter frame relation based version of the slices for the current frame does not contain an I-frame, the controller retrieves the I-frame only version for the current frame. Subsequently, in fourth step 44 NAL units with the I-frame only version is transmitted for those slices for which it was retrieved and the inter frame relation based version of the other slices is transmitted. This may comprise retrieving and transmitting meta data applicable to the I-frame only version or the inter frame relation based version, whichever was transmitted.

In the network source system the slices are decoded according which version was transmitted. This enables decoding of the slices outside the overlap between the new and previous sub-array to be decoded from the first frame in which the indicated selection of slices becomes effective and to continue inter frame relation based version decoding for the slices in the overlap.

Although embodiments have been shown wherein the headers of the NAL units are rewritten in the network destination system, it may be noted that alternatively the network source system may be configured to transmit adapted NAL units.

In an embodiment, alternative versions of the header and number of padding bits for the NAL units of all slices of the full encoded bitstream may be stored for each NAL unit in the storage system 120 of the network source system 12. Each alternative version corresponds to a different length of the indication of the spatial location of the slice. That is, it may comprise a number of padding bits that ensures that the video content data will start at a word boundary when an indication of the spatial location of the slice of the relevant length is used. Such alternative versions may be created for example based on an original HEVC bitstream, by rewriting the original video bitstream a number of times with padding for different lengths length of the indication of the spatial location of the slice. Such re-writing may be done before the specific locations of requested sub-arrays are known, e.g. by determining the required padding based on meta data or by parsing of the bitstream. Alternatively, the different versions may be generated already when the stream is encoded to begin with.

At least a version for sizes of the indication of the spatial location of the slice in the full video image and a version for one standard size of the indication of the spatial location of the slice for a sub-array may be stored, but in addition more versions for different lengths of the indication of the spatial location of the slice may be stored, e.g. for eight different sizes. The alternative versions of the header and padding bits may be part of alternative NAL units that contain the same video content data.

In this embodiment, the network destination system may be configured to obtain a selected version of the NAL units, dependent on the sub-array dimension. In this embodiment, the stream pre-processor of the network destination system substitutes the indications of the spatial location of the slices in the NAL units before they are passed to the decoder. Preferably, the alternative versions stored in the network source system contain the original indications of the spatial location of the slices needed to distinguish slices in the full image, i.e. addresses with a larger length of the indication of the spatial location of the slice than the lengths of the indication of the spatial location of the slice for which the versions are intended, and with a number of padding bits corresponding to that version. That is, in the versions obtained from the network source system the start of the video data need not yet be aligned to a word boundary, but the padding bits are selected so that it will be aligned after substitution with the shortened slice indication of the spatial location of the slice. Accordingly, stream pre-processor 142 may be configured to read the original indication of the spatial location of the slice from the obtained version of the NAL unit, map this original indication of the spatial location of the slice to the shortened address, substitute the resulting shortened address in the obtained version of the NAL unit and move the subsequent part of the obtained version of the NAL unit relative to its starting point so as to compensate for the shorter length of the shortened address. The number of padding bits in the obtained version is selected so that this results in alignment of the start of the video content data.

Alternatively, least significant parts of the indications of the spatial location of the slices may be stored in the versions of the NAL unit, i.e. indications that uniquely distinguish slices within any sub-arrays, but may be the same for slices that are farther apart, with a length that corresponds to the length of the indication of the spatial location of the slice associated with the version. In this case, the pre-processor of the network destination system may request the NAL unit from the network source system based on their full addresses, and the stream pre-processor 142 may be configured to map the least significant part of the original indication of the spatial location of the slice from the NAL unit to the shortened address.

Figure 7:
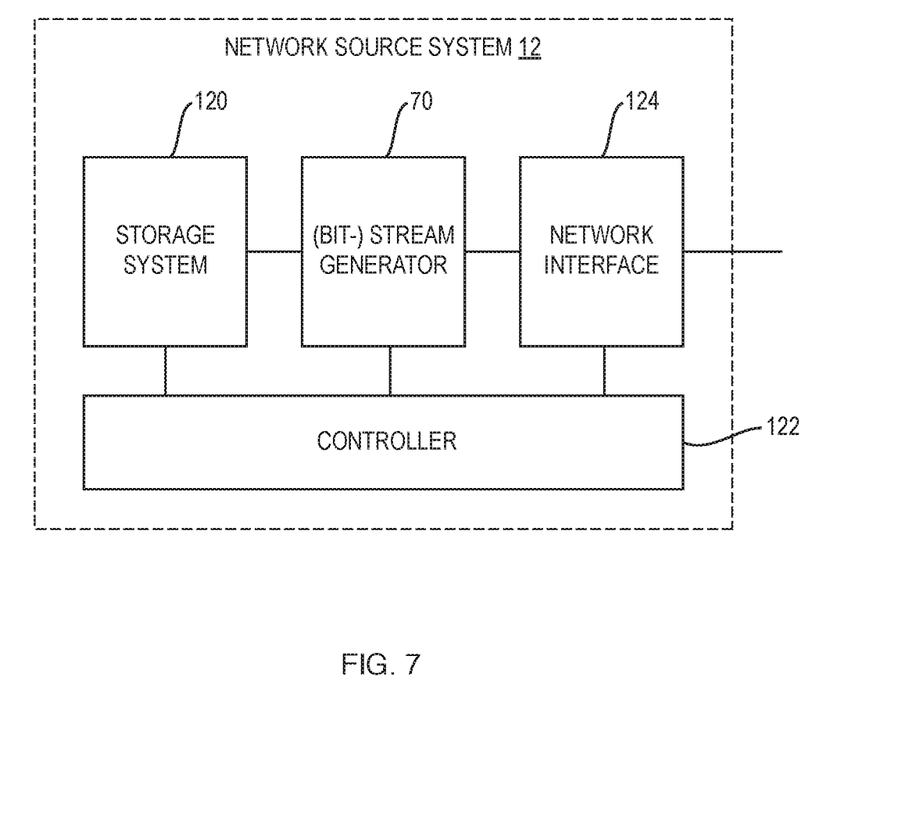
FIG. 7 shows an embodiment of a network source system

FIG. 7 shows an embodiment of a network source system with a (bit-)stream generator 70 between storage system 120 and a network interface 124. Stream generator 70 may be part of controller 122, but for the sake of illustration stream generator 70 is shown separately, and controller 122 is shown coupled to all units. In operation controller 122 receives an indication of the selected sub-array via network interface 124 from a network destination system (not shown). In response, controller 122 causes transmission of a video stream with selected NAL units from the network source system.

In a first embodiment, stream generator 70 may be a stream pre-processor similar to the stream pre-processor 142 disclosed for the network destination system. Such a stream generator 70 in the network source system may be configured rewrite the NAL units before transmission, in a way as described for the stream pre-processor of the network destination system, using the meta data. In this case the meta data need not be transmitted to the network destination system and stream pre-processor of the network destination system may be omitted.

In an alternative embodiment, the stream generator 70 in the network source system may be configured to perform only part of the rewriting. For example, the stream generator 70 in the network source system may be configured to change the position of the part of the header after the field for the indication of the spatial location of the slice to ensure word boundary alignment of the video data after the header, without rewriting the indications of the spatial location of the slices or merely truncating the indications of the spatial location of the slices in terms of the full image, e.g. by leaving out a part that distinguishes between slices that as so far apart that they cannot be part of the same sub-array (this part will be referred to as the most significant part). The stream-preprocessor may be configured to rewrite these indications or the postprocessor may be configured to remap the slices, based on information about the selected sub-array and on the slices within the sub-array that correspond to different truncated indications. For example, the stream pre-processor of the network destination system may be configured to substitute the indications of the spatial location of the slices without changing the position of the part of the header after the field for indication of the spatial location of the slice. Frequent transmission of meta data may be omitted in this case if stream pre-processor of the network destination system rewrites only data at predetermined locations. As described, substitute indications of the spatial location of the slices that address slices using a predetermined set of values of the indications of the spatial location of the slices may be used, where the predetermined set depends on the dimensions of the sub-array, but not on its location in the full images.

In the embodiment wherein the storage system 120 stores alternative versions of the header and number of padding bits for the NAL units of all slices of the full video stream, the controller 122 of the network source system or the stream generator 70 may be configured to select between the different versions dependent on the sub-array dimension selected by the network destination system. The stream generator 70 may be configured to pass only the selected versions of the network layer application units for the selected slices to the network interface 124 for transmission, after obtaining the alternative versions of the header and number of padding bits for the selected slices address length from storage system 120.

In this embodiment, the stream pre-processor of the network destination system substitutes the indications of the spatial location of the slices in the NAL units before they are passed to the decoder. In an alternative embodiment, this may be done by the stream generator. But this would increase the source side computational burden, since the stream generator would have to apply address mapping specific to the destination. In this case alternative versions of the header and number of padding bits need not be stored as part of complete alternative NAL units. The stream generator 70 may retrieve video content data for the network abstraction layer (NAL) unit, which is the same for all lengths of indications of the spatial location of the slice from the storage system 122 and append it to a retrieved header for the selected slice address length, for use in the transmission.

For the sake of illustration the embodiments have been described in terms of the HEVC standard. But it should be appreciated that the invention is not limited to this standard. The HEVC standard merely illustrates a type of encoded video stream wherein full video images are encoded divided into a spatial array of independently decodable slices, using network abstraction layer units that each contain video content data for a respective one of the slices preceded by a header that comprises parameters relating to the respective one of the slices in relation to the first video stream. The HEVC standard merely is merely an example of a way of encoding wherein each independently decodable slices can be associated with a respective spatial location (of a region) in the images, using a direct or indirect indication of the location of the slice in the image. Use of a slice identification is merely an example of such an indication of the location of the slice. Other indications, such as coordinates, sequence number etc. may be used.

Furthermore, although applications have been described in terms of communication of the network abstraction layer units by network source and destination devices over a network such as the Internet, it should be appreciated that instead source and destination devices may be used that communicate over other networks or via communication channels that are not networks e.g. via a wired or wireless point to point communication channel, a communication bus etc.

The invention claimed is:

1. A method of decoding encoded video data from a first video stream that comprises video images encoded on the basis of a video codec, said video images having an image region and being divided into a spatial array of independently decodable slices, the spatial array being associated with a first picture size, the first video stream comprising network abstraction layer units that each contain video content data for a respective one of the slices preceded by a header that comprises parameters relating to the respective one of the slices in relation to the first video stream, the method executed by a decoder apparatus, the method comprising:

partially rewriting the network abstraction layer units for a sub-array of slices into rewritten network abstraction layer units, the network abstraction layer units being rewritten at a location in each of the respective network abstraction layer units, wherein said location is selected on the basis of meta data, said location comprising an indication of the spatial location of each respective slice, the rewritten network abstraction layer units forming a second video stream comprising encoded video data only for the sub-array of slices, said encoded video data representing partial video images that comprise a sub region of said image region, wherein said rewritten network abstraction layer units are decodable into said partial video images on the basis of said video codec; and decoding the rewritten network abstraction layer units, said decoding performed on the basis of a second picture size associated with said sub-array, wherein said second picture size is smaller than said first picture size.

2. The method according to claim 1, wherein said partially rewriting comprises:

rewriting a parameter in a header located in a network abstraction layer unit for each slice in the sub-array of slices with an altered bit length;

changing positions of a part of bits in said header following said parameter relative to a starting point of the network abstraction layer unit; and adding or removing padding bits in the network abstraction layer unit so that a start of data after said header in the network abstraction layer unit is aligned at a multi-bit word boundary, wherein a length of said part of the header and a number of added or removed padding bits are determined on the basis of the meta data.

3. The method according to claim 1, wherein said partially rewriting comprises rewriting indications of the spatial location of the slices in the network abstraction layer units for the sub-array of slices, using a predetermined set of altered indications of the spatial locations of the slices whereby the altered indications distinguish the spatial locations of the slices within the sub-array, wherein said meta data comprises said predetermined set.

4. The method according to claim 3, further comprising:
defining a map of values of the indications of the spatial location of the slices in the spatial array to target values indicating the spatial location of the slices in the sub-array of slices;
changing said sub-array into a new sub-array, said new sub-array comprising at least one slice that is different from the slices of said sub-array;
keeping the target values of the indications of the spatial location of the slices in said map for slices that belong to an overlap between the new sub-array and said sub-array;
redefining said map using the target value of the indication of the spatial location of the at least one slice that does not belong to the overlap; and
post-processing the decoded partial video images to re-position image blocks that correspond to the slices of the new sub-array in a spatial sequence that corresponds to their spatial sequence in the full video images.

5. The method according to claim 1, executed by a destination device communicatively coupled to a source device, the method further comprising:
obtaining the network abstraction layer units only for the sub-array from the source device; and
performing said partial rewriting of the network abstraction layer units between receiving of the network abstraction layer units in the destination device and their use for said decoding in the destination device.

6. The method according to claim 5, the method further comprising:
selectively obtaining the network abstraction layer units for the sub-array from the source device,
selectively obtaining the network abstraction layer units for a new sub-array from the source device, using network abstraction layer units from a first and second version of the first video stream,
the first version comprising inter frame relation based image data
and the second version comprising only data encoded independent of inter frame relations,
network abstraction layer units from the first and second version being used for slices within and outside an overlap between the sub-array and the new sub-array respectively, until a frame wherein the network abstraction layer units of the first version comprise a frame encoded independent of inter frame relations; and
subsequently obtaining network abstraction layer units using network abstraction layer units comprising image data encoded dependent of inter frame relations for all slices within the new sub-array.

7. A decoding device comprising:
a controller, configured to indicate a selection of a sub-array of a spatial array of independently decodable slices in a first video stream that comprises video images encoded on the basis of a video codec,
said video images having an image region and being divided into the spatial array, said spatial array associated with a first picture size,
the first video stream comprising network abstraction layer units that each contain video data for a respective slice preceded by a header that comprises parameters relating to the respective slice in relation to the first video stream;
a stream pre-processor, configured to receive meta data and network abstraction layer units that comprise the encoded video data for the respective slices in the sub-array,
the meta data indicating one or more locations in the network abstraction layer units, said locations comprising an indication of the spatial location of one or more slices,
the stream pre-processor being configured to:
rewrite partially the network abstraction layer units for the sub-array of slices into rewritten network abstraction layer units, at a location in each of the respective network abstraction layer units,
wherein said location is selected on the basis of the meta data, said location comprising an indication of the spatial location of each respective slice,
the rewritten network abstraction layer units forming a second video stream that comprises encoded video data only for the subarray of slices,
said encoded video data representing partial video images that comprise a sub region of said image location,
and wherein said rewritten network abstraction layer units are decodable into said partial video images on the basis of said video codec;
a decoder, with an input coupled to the stream pre-processor, and configured to decode said rewritten network abstraction layer units,
the decoder being initialized for a second picture size associated with said sub-array,
wherein said second picture size is smaller than said first picture size.

8. The decoding device according to claim 7, wherein the controller is configured to
transmit the indication of the selection to a remote source device,
for causing the source device to transmit the meta data and network abstraction layer units that comprise the encoded video data selectively for the respective slices in the sub-array to the stream pre-processor,
the stream pre-processor being configured to receive the meta data and network abstraction layer units from the source device.

9. The decoding device according to claim 7, wherein the stream pre-processor is configured to:
rewrite a parameter in the header of the network abstraction layer unit for each sub-array of slices with an altered bit length;
change positions of bits of the header following said parameter relative to starting point of the network abstraction layer unit; and
add and/or remove padding bits in the network abstraction layer unit so that a start of data after the header in the network abstraction layer unit is aligned at a multi-bit word boundary, wherein a length of said part of the header and a number of added or removed padding bits are determined on the basis of the meta data.

10. The decoding device according to claim 7, wherein the stream pre-processor is configured to
  rewrite values of the indications of the spatial locations of the slices in the network abstraction layer units for the sub-array of slices,
  using a predetermined set of altered values of the indications of the spatial location of the slices to distinguish locations within the sub-array.

11. The decoding device according to claim 7, wherein the stream pre-processor is configured to
  rewrite the indications of the spatial location of the slices in the application layer units for the sub-array of slices under control of a map that defines values of the indications of the spatial location of the slices in the spatial array to target values indication of the spatial location of the slices in the sub-array,
  wherein the controller is configured to define the map and to:
  change a selection of the subarray from the spatial array of slices to a selection of a new subarray from a selection of a previous subarray;
  keep the target values of the indications of the spatial location of the slices in said map for slices that belong to an overlap between the new sub-array and the previous sub-array; and
  redefine said map using the target values of the indications of the spatial location of the slices for the sub-array of slices that do not belong to the overlap;
  the decoding device comprising a postprocessor with an input coupled to the decoder, configured to post-process the decoded images to re-position image blocks that correspond to the slices of the new sub-array in a spatial sequence that corresponds to their spatial sequence in the full video images.

* * * * *